Figure 1:
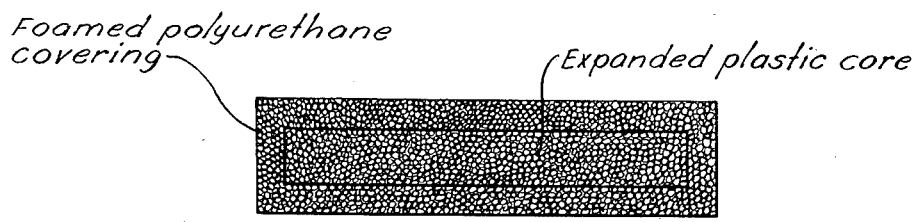

United States Patent Office 3,029,172
Patented Apr. 10, 1962

3,029,172
POLYURETHANE FOAM-COATED EXPANDED PLASTIC INSULATION AND ROOF BOARD
John Y. Glass, Midland, Mich., assignor to The Dow Chemical Company, Midland, Mich., a corporation of Delaware
Filed Mar. 28, 1960, Ser. No. 17,912
4 Claims. (Cl. 154—45)

The present invention relates to a polyurethane foam-coated expanded plastic and is more particularly concerned with a polyurethane foam-coated expanded alkenyl aromatic or α-olefin resin article which is useful as an insulation board and is particularly adapted for use as a direct insulation component of a roof structure.

A conventional roof structure is composed of a bottom layer or roof deck, such as wood, concrete, steel or the like which is overlayed with a vapor seal or barrier such as one or more coatings of asphalt, or preferably, alternate layers of felts coated with asphalt or bitumen. An insulating layer of a fiber board such as Celotex, Fesco board fiber board, or fiber glass is next applied, followed by another coating of bitumen or asphalt or alternate layers of bitumen and felt and, finally, the finishing layer of asphalt shingles and the like.

The presently used insulating layers generally have low water resistance, requiring great care in the preparation of the vapor seal.

It would be highly advantageous, and it is an object of this invention, to provide a permanent water impervious, heat and solvent resistant, lightweight insulating component which has a low "K" factor (B.t.u./(hour)(feet²) (° F./in.)), and high impact, flexural and compressive strength.

It is a further object to provide an insulated roof structure containing the insulating component of this invention.

The insulating component of the present invention is prepared by spraying, molding, or otherwise coating an expanded alkenyl aromatic or α-olefin resin with a foamed castor oil, polyester or polyether-type rigid or semi-rigid polyurethane resin.

The polyurethane foams which are suitable have heat distortion temperatures of from about 230° to about 275° F. or above. This temperature will be higher when suitable additives are incorporated therein.

The heat distortion temperatures of the expanded alkenyl aromatic and α-olefin resin cores are from about 160° to about 200° F.

Surprisingly, I have found that a thin covering of the polyurethane foam will protect the inner core against distortion or melting and will impart excellent dimensional stability to the insulating component of this invention when hot tar or bitumen is applied at 525° F.

I have further found that the composite article obtained by coating an expanded alkenyl aromatic or α-olefin resin with a polyurethane foam is capable of withstanding far greater stresses than either article of comparable size when tested alone.

By an "alkenyl aromatic resin" is meant a solid polymer of one or more polymerizable alkenyl aromatic compounds. The polymeric resin comprises in chemically combined form at least 50 percent by weight of at least one alkenyl aromatic compound having the general formula:

$$Ar-\underset{\underset{R}{|}}{C}=CH_2$$

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, α-methylstyrene, ortho-methylstyrene, metamethylstyrene, paramethylstyrene, ar-ethylstyrene, ar-vinylxylene, ar-chlorostyrene, the solid copolymers of two or more of such alkenyl aromatic compounds with one another, and solid copolymers of one or more of such alkenyl aromatic compounds with minor amounts of other readily polymerizable olefinic compounds such as divinylbenzene, methyl-methacrylate, acrylonitrile, etc.

By an "α-olefin resin" is meant a solid polymer comprising in chemically combined form at least 50 percent by weight of one or more polymerizable α-olefinic compounds, such as ethylene, propylene, and the like.

The core material may be expanded by any known method such as extrusion of a mobile gel containing a blowing agent, foaming-in-place bead techniques, and the like.

The expanded core materials and surface covering may contain pigments, fillers, self-extinguishing agents and the like, as desired.

The polyurethane foam coating may contain minor amounts of other copolymerized monomers which serve to impart desired properties for certain uses, such as vinyl chloride to increase dimensional stability to boiling water, substituted polymethylol phenols to increase heat resistance, and the like.

A core material of any desired thickness may be used, although preferably planks or boards of from about ½ inch to 6 inches are used, to obtain high strength and low K factors.

A polyurethane foam coating of any desired thickness may also be applied. Preferably a coating thickness of from about ⅟₁₆ inch to about 1 inch is employed.

The insulating planks or boards of this invention may be placed directly on the roof deck, i.e. wood, concrete, steel or the like and permanently joined at all joints, butts, or cut pieces by spraying or "laying in" techniques of polyurethane foam, which bonds securely to the expanded core materials and to the foam covering without the use of adhesives. In this manner a permanent, water impervious, heat and solvent resistant, lightweight insulating component is installed which has a low "K" factor and high impact, flexural and compressive strengths.

Figure 2:
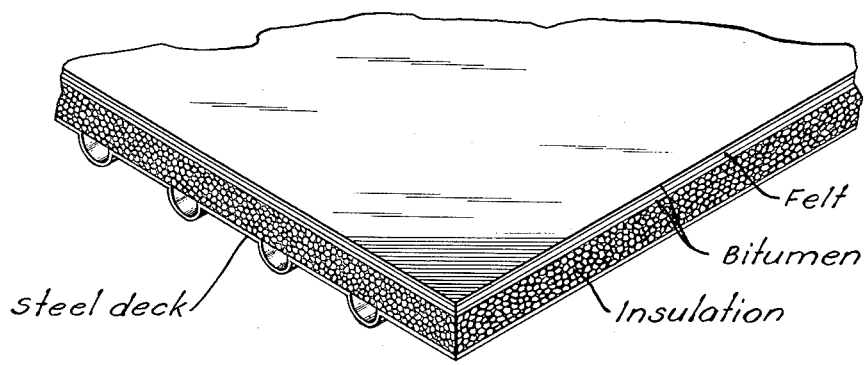

The invention is illustrated in the attached drawings wherein FIG. 1 is a cross section of the insulation board and FIG. 2 is a fragmentary section of a corner of a complete roof structure in accordance with the present invention.

The invention may be further illustrated but is not to be construed as limited by the following examples wherein all parts are by weight:

*Example I*

A mixture of 48.25 parts of butylene-oxide prepolymer adduct prepared by reacting a glycerine-butylene oxide triol having a molecular weight of about 500 with sufficient tolylene diisocyanate to give a free NCO content of 24.9%, 0.55 part of 2,2,1-diazobicyclooctane, and 0.30 part of a water soluble silicone surfactant was charged into a pressurized mixing tank, while a mixture of 35.9 parts of butylene-oxide crosslinker prepared by reacting a mixture of 40% glycerine and 60% sucrose with sufficient butylene oxide to give a resin containing 14.15% OH, and 15.0 parts of trichloromonofluoromethane were charged to a second pressurized mixing vessel. A "Gusco" Model C spray gun was used to pressure spray this formulation onto boards of expanded polystyrene, 2 feet by 4 feet by 1 inch thick. The boards were coated on all sides with foamed polyurethane varying from ⅛ inch to ⅜ inch thick. The boards were air dried and found to have a tensile bond between the coating and core of 27 pounds/in.² and greater. A board having a ⅛ inch coat was tested over a 3 inch aperture under 500 pounds of uniform load and found to be unaffected. The dimensional stability of bitumen at 525° F. was excellent. Excellent resistance to pitch and fire resistant adhesives containing halogenated solvents was observed up to 160° F.

A ½ inch core, coated with ⅛ inch polyurethane on all sides, had a "K" factor of 0.26.

*Example II*

In a similar manner, a polyester type polyurethane foam was coated on a polystyrene core with similar results.

Expanded polyethylene, polypropylene, copolymers thereof with each other or with butylene may be coated with castor oil, polyester, or polyether-type polyurethane foams with similar results.

Various modifications may be made in the present invention without departing from the spirit or scope thereof, and it is understood that I limit myself only as defined in the appended claims.

What is claimed is:

1. A heat resistant insulation board comprising a core of a member of the group consisting of expanded alkenyl aromatic and α-olefin resins and a tightly adhering coating of a polyurethane foam.

2. An insulated roof structure containing as the insulation layer the article of claim 1.

3. In an insulated roof structure comprising a roof deck, a vapor barrier, and an insulating material the improvement which comprises utilizing a polyurethane foam coated core of a member of the group consisting of expanded alkenyl aromatic and α-olefin resins as the vapor sealing and insulating member.

4. The roof structure of claim 3 wherein the core member is expanded polystyrene.

References Cited in the file of this patent

UNITED STATES PATENTS

| 2,681,321 | Stastny et al. | June 15, 1954 |
| 2,861,525 | Curtis et al. | Nov. 25, 1958 |

FOREIGN PATENTS

| B. 29,206 | Germany | Mar. 8, 1956 |